(12) United States Patent
Lunsford et al.

(10) Patent No.: US 6,901,434 B1
(45) Date of Patent: May 31, 2005

(54) SYNCHRONIZATION OF DATA BETWEEN TWO HANDHELD COMPUTERS

(75) Inventors: E. Michael Lunsford, San Carlos, CA (US); Jesse Donaldson, Sunnyvale, CA (US); Francis J. Canova, Jr., Fremont, CA (US)

(73) Assignee: PalmSource, Inc., Sunnyvale, CA (US)

( * ) Notice: Subject to any disclaimer, the term of this patent is extended or adjusted under 35 U.S.C. 154(b) by 490 days.

(21) Appl. No.: 09/587,090

(22) Filed: May 31, 2000

(51) Int. Cl.[7] .............................................. G06F 15/16
(52) U.S. Cl. ...................................................... 709/216
(58) Field of Search ................................ 709/216, 217, 709/246

(56) References Cited

U.S. PATENT DOCUMENTS 5,832,489 A * 11/1998 Kucala ........................ 707/10
5,974,238 A * 10/1999 Chase ......................... 709/248
6,000,000 A * 12/1999 Hawkins et al. ............. 707/201
6,006,274 A * 12/1999 Hawkins et al. ............. 709/248

* cited by examiner

Primary Examiner—David Y. Eng
(74) Attorney, Agent, or Firm—Hickman Palermo Truong & Becker LLP

(57) ABSTRACT

A method for communicating between a first handheld computer and a second handheld computer is provided. The method includes selecting at least a first information item from a first index on the first handheld computer, and signaling the first information item to the second handheld computer. The method includes identifying a second information item on the second handheld computer that corresponds to the first information item, and synchronizing the second information item with the first information item.

47 Claims, 7 Drawing Sheets

SYNCHRONIZATION OF DATA BETWEEN TWO HANDHELD COMPUTERS

BACKGROUND OF THE INVENTION

1. Field of the Invention

This invention relates to the field of handheld computers. In particular, the invention relates to data synchronization between handheld computers.

2. Description of the Related Art

Handheld computers employ synchronization programs to exchange information with larger personal computers. Typically, handheld computers use conduits to synchronize information. The conduits reside on the computer system that communicates with the handheld computer. From time to time, the user can synchronize the information on the handheld computer with information residing on the larger computer. In this way, the handheld computer can act as a portable extension of a personal computer. The user of the handheld device is then able to use the handheld computer as an extension of the larger personal computer.

SUMMARY OF THE INVENTION

An embodiment of the invention includes a synchronization process that enables a handheld computer to exchange information with another handheld computer. The synchronization process may be configured to synchronize information items according to a specific identity or profile of the other handheld computer or user.

DETAILED DESCRIPTION

An embodiment of the invention includes a handheld computer having a conduit to synchronize information with another handheld computer. The conduit may synchronize with other handheld computers using a wireless medium. Further, the handheld computer may configure the synchronization according to the identity of the other user or handheld computer.

Previous handheld computers have used synchronization conduits to enable handheld computers to act as extensions of larger computers, such as desktop or laptop computers. Examples of such previous systems are provided in U.S. Pat. No. 5,832,489, U.S. Pat. No. 6,000,000, and U.S. Pat. No. 6,006,274, all of which are incorporated by reference herein.

Embodiments of the invention provide a more configurable and flexible synchronization process for synchronizing and exchanging information between handheld computers. This enables the handheld computers to communicate and exchange information in a manner that is more efficient than previous systems.

A. Overview

Figure 1:
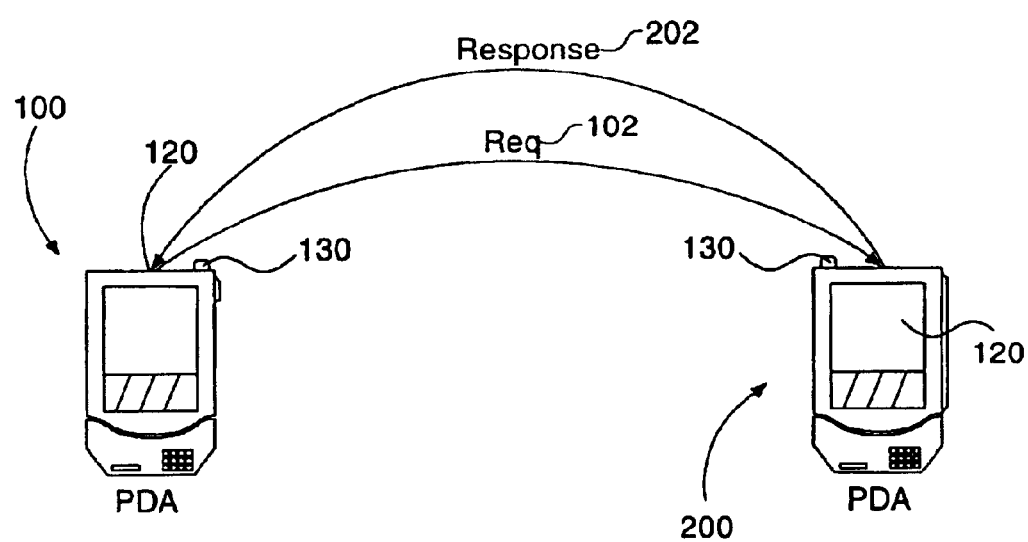
FIG. 1 is a block diagram of a first handheld computer synchronizing with a second handheld computer, under an embodiment of the invention.

FIG. 1 illustrates a first handheld computer 100 communicating with a second handheld computer 200, for purpose of synchronizing information stored on one or both handheld computers 100, 200. In an embodiment, first handheld computer 100 signals a request 102 to synchronize information stored on second handheld computer 200 with first handheld computer 100. The second handheld computer 200 then signals a response 202 to synchronization request 102. The response 202 may include an acceptance or rejection of synchronization request 102. If the response 202 includes an acceptance, second handheld computer 200 may simultaneously or subsequently transmit to first handheld computer 100 one or my information items. The information items are then synchronized against existing information items on first handheld computer 100. This may require information items transmitted from second handheld computer 200 to be individually synchronized against corresponding individual information items existing on first handheld computer 100. The synchronization process may also be performed on the second handheld computer 200, with information received from the first handheld computer 100.

As used herein, synchronizing refers to a process in which information items appearing on different computers are made to share the same information, appearance, or configuration. Examples of information items include records, segments of records, files, programs and applications. In an embodiment, synchronization is assumed to be performed by a synchronization conduit residing on one or both handheld computers. The synchronization conduit may synchronize files so that they share the same records or other information items. Similarly, the synchronization conduit may synchronize handheld computers to share the same application or executable, or a common configuration for the application or executable.

In an embodiment, first handheld computer 100 communicates with second handheld computer 200 through a wireless medium. Each handheld computer 100, 200 includes a wireless communication port 130. Examples of wireless communication ports include infra-red (IR) ports, and RF ports such as ports operating under a Bluetooth protocol.

In particular, handheld computers that operate wireless port 130 using a Bluetooth protocol may contact numerous handheld computers in a given vicinity at the same time. In one embodiment, second handheld computer 200 may be selected from a group of handheld computers in the given vicinity. In another embodiment, first handheld computer 100 may communicate and synchronize with multiple handheld computers in the given vicinity.

In an embodiment, each handheld computer includes a touch-sensitive display 120 that displays application user-interfaces. The first handheld computer 100 enables user-input through select contact with portions of display 120. The handheld computers 100, 200 also include application buttons to open application programs and enter user-input.

Examples of handheld computers for use with embodiments of this invention include any one of the PalmPilot®, Palm III®, Palm V®, and Palm VII® organizers, manufactured by Palm Inc. Other embodiments of the invention can include handheld computers operating a Palm OS®, Windows CE® or Pocket PC® operating system.

B. Flow Processes for Operating Synchronization Conduit

Figure 2:
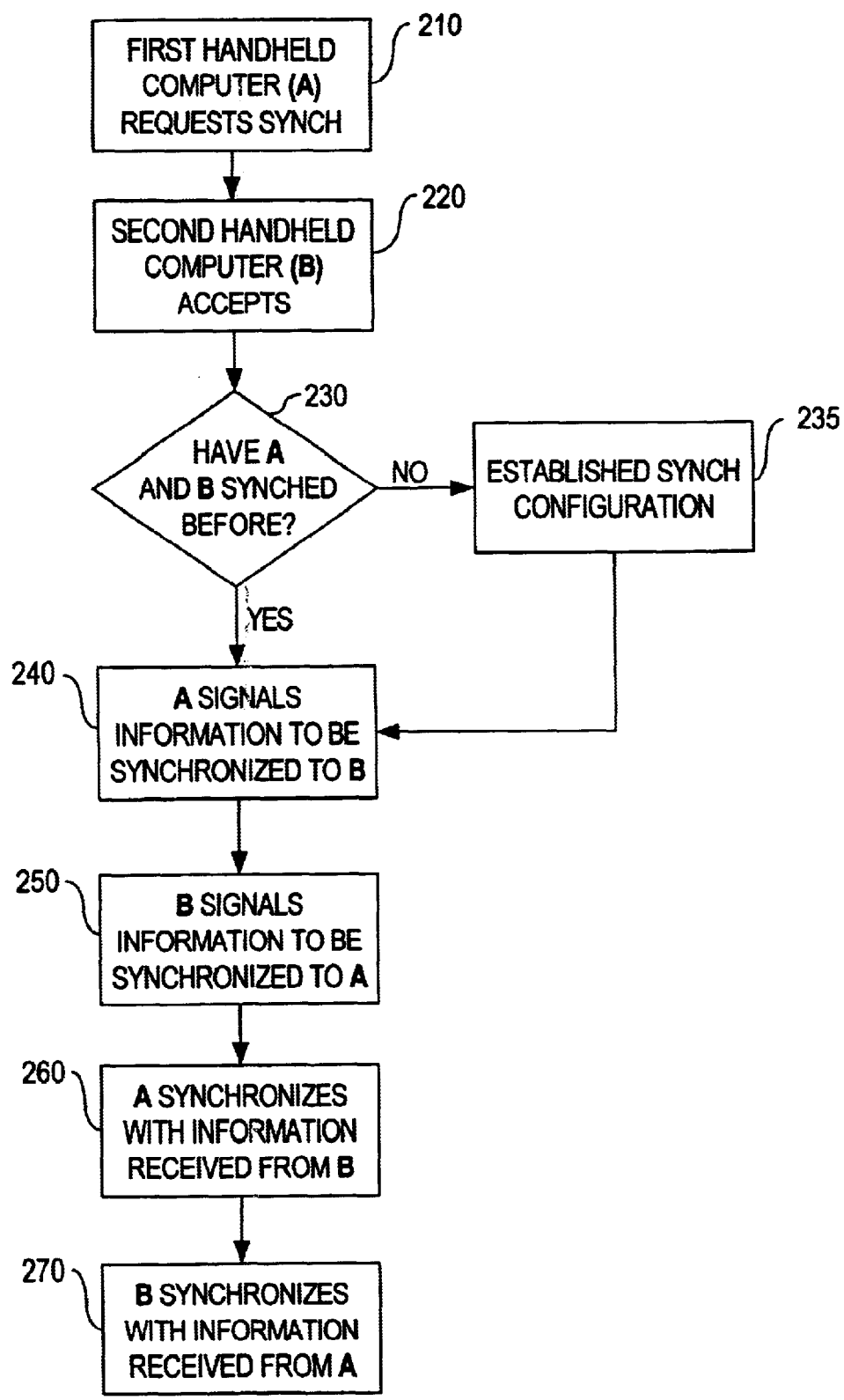
FIG. 2 is a flow process for operating a synchronization conduit on the handheld computer, under an embodiment of the invention.

FIG. 2 is a flow chart for synchronizing first handheld computer 100 with second handheld computer 200. In step 210, one of the handheld computers 100, 200 requests to synchronize with the other handheld computer 100, 200. In an embodiment, the requesting and accepting handheld computers are both assumed to perform the synchronization process. In other embodiments, only one of the handheld computers performs the synchronization process. That handheld computer performing the synchronization process may signal synchronized information to the other handheld computer.

For purpose of description, first handheld computer 100 is assumed to signal the requests to synchronize with second handheld computer 200. The request may be made through user-input into handheld computer 100. For example, a user may request to synchronize by dragging and clicking a user-interactive feature (icon, menu item) on display 120, which in turn signals a processor of first handheld computer 100 to beam the request to second handheld computer 200 through the wireless port 130. Alternatively, the user may use one of the application buttons to beam the request to second handheld computer 200.

The request from handheld computer 100 may be a general request for synchronization. The general request may be to synchronize all information items on the handheld computers 100, 200, or all information items in a particular category, such as a folder. The general request may also be for all information associated with the requestor's identification, which may cause the accepting handheld computer to access a profile or folder associated with that identification. Alternatively, the request may be specific for a record, file, collection of records and/or files, or application(s) to be synchronized. The request may, for example, specify a record or file identifier, such as a contact name or a file name.

In step 220, second handheld computer 200 accepts the request. The acceptance may be automatic, or manually entered by the user of second handheld computer 200. For example, second handheld computer 200 may recognize first handheld computer 100 through an identification transmitted with the request. Alternatively, a dialogue box or other feature may prompt the user of second handheld computer 200 to accept the synchronization request from the first handheld computer 100.

In step 230, a determination is made as to whether first and second handheld computers 100, 200 have synchronized before. If the first and second handheld computers 100, 200 have not previously synchronized, then in step 235 a configuration profile between first and second handheld computer 100, 200 is established. The configuration profile may establish the protocol for operating a synchronizing conduit on each handheld computers 100, 200. The configuration profile may allow the users of handheld computers 100, 200 to identify which information is to be synchronized between the two handheld computers. The configuration profiles may be configurable by users of each handheld computer 100, 200.

As an alternative to establishing a configuration profile, in step 235, either one or both of handheld computers 100, 200 may display a message to inform the user that it is the first time a synchronization will be performed between the two handheld computers 100, 200.

In step 240, first handheld computer 100 signals records, files, collection of records or files, or an application(s) to be synchronized to second handheld computer 200. The first handheld computer 100 may transmit the information in response to receiving the acceptance from second handheld computer 200. Alternatively, the information may be transmitted with the initial request in step 210.

In an embodiment, information identified for signaling to second handheld computer 200 may be manually selected by the user of first handheld computer 100. In other embodiments, the information signaled to second handheld computer 200 may be selected based on the identity of second handheld computer 200. The identity of second handheld computer 200 may be signaled with for example, the acceptance to the synchronization process.

In step 250, second handheld computer 200 signals information to be synchronized to first handheld computer 100. The information transmitted from second handheld computer 200 may be signaled with the acceptance of the synchronization request in step 220. Alternatively, the information transmitted from second handheld computer 200 may be responsive to information being received from first handheld computer 100 in step 240.

In an embodiment, information signaled to the first handheld computer 100 is based on information received from the first handheld computer 100. In another embodiment, a request or subsequent transmission from first handheld computer 100 includes an identification. The identification of first handheld computer 100 may be used to identify records, files, and folders that are predetermined for synchronization with first handheld computer 100.

In step 260, first handheld computer 100 synchronizes information received from second handheld computer 200 with the information that first handheld computer 100 signaled to second handheld computer 200.

Likewise, in step 270, second handheld computer 200 synchronizes information received from first handheld computer 100 with the information that second handheld computer 200 signaled to first handheld computer 100.

Prior to performing the synchronization processes, each handheld computer 100, 200 may first access a synchronization configuration The synchronization configuration may be established separately on each handheld computer. As described with step 235, the synchronization configuration may be established on each handheld computer 100, 200 the first time the two handheld computers are synchronized.

Reference to synchronization of information or information items implies that a synchronization conduit (FIG. 5) on one handheld computer synchronizes one or more individual information items received from another handheld computer with selected information of the handheld computer where the conduit resides. During the synchronization process, information items that conflict between the handheld computers are made to not conflict. Information items signaled from the other handheld computer that are determined not to reside on the receiving handheld computer are added to the receiving handheld computer. Likewise, information items previously synchronized but subsequently deleted from one handheld computer can be deleted from the other handheld computer.

As used herein, information items include records, segments of records, folders containing records, files, and applications. Examples of records include contact information, memo files, and calendar events. Segments of records include data fields and/or content records, such as phone numbers for contacts.

In an embodiment, the synchronization configuration specifies a protocol for operating the synchronization conduit. The protocol for operating the synchronization conduit on each handheld computer 100, 200 may differ depending on the type of information being shared by the two handheld computers. Furthermore, multiple protocols may be used, including separate synchronization protocols for non-conflicting and conflicting information.

In an embodiment, synchronization may be performed on the requesting and/or accepting handheld computers using one or more of the following protocols. Under a first protocol, information from one of the handheld computers is designated to overwrite or replace conflicting information from another of the handheld computers. As used herein, conflicting information between two handheld computers implies that an information item on each handheld computer share a same information item identifier. However, the information items conflict if they do not have the same information content, or if they do not share some other configuration required by the synchronization conduit. As an example, the conflicting information item residing on both handheld computers 100, 200 may be a contact information. A user of first handheld computer 100 may alter the information item, such as by changing a phone number as a result of a recent correspondence with the contact. The user of second handheld computer 200 may have less frequent correspondence with the contact, so the contact information on second handheld computer 200 is different than the more recently updated phone number on first handheld computer 100. In this example, the synchronization conduit identifies that the information items of each handheld computer 100, 200 for that contact correspond to one another. The contact information on each handheld computer 100, 200 is said to conflict, and the conduit synchronizes the matching information item by making each contact information the same.

Under variations of the first synchronization protocol, a system may be configured so that information from the requesting handheld computer overwrites conflicting information of the accepting handheld computer. Alternatively, the system may be configured so that information on the accepting handheld computer overwrites conflicting information originally residing on the requesting terminal. Still further, information residing on the handheld computer performing the synchronization process may be overwritten by the information received from the other of the handheld computers.

The variations of the first protocol may be combined or configured by the user of each handheld computer 100, 200. For example, in one variation of the first protocol, the user of the handheld computer performing the synchronization is given the choice to select between a file of information items existing on the handheld computer prior to the synchronization, and a file of information items signaled from the other computer. The user may make the selection through interaction with the handheld computer after the synchronization process is initiated. Alternatively, the user may configure the conduit to accept one or the other of the files once the synchronization is initiated.

Under a second protocol, if information originally residing on one of the handheld computers has no correspondence on another handheld computer, the synchronization process may cause the information to reside on both handheld computers. An index list comprising information items may include additional information items if the additional information items are determined during the synchronization process to be new to the handheld computer.

Under a third protocol, the handheld computer(s) performing the synchronization process determines the more recently updated or altered information when information residing on both terminals conflicts. For example, if records sharing the same name reside on both handheld computers, and a portion of the record on one handheld computer conflicts with a corresponding portion of the record on the other handheld computer, then the handheld computer performing the synchronization process determines which of the conflicting information is more recently updated. The resulting synchronized record may be a combination of both original records, containing only the more recently updated or altered information.

Under a fourth protocol, the users of handheld computer 100, 200 determine, which of the protocols are to be used. For example, if in step 230, the determination is made that handheld computers 100, 200 never before synchronized, then in step 235 the users of handheld computers 100, 200 may be prompted to enter which information is to be overwritten.

To perform synchronization, handheld computer 100, for example, receives one set of information from second handheld computers 200. The set of information may include information items such as records, files, folders and applications. The first handheld computer 100 then identifies each information item signaled from second handheld computer 200. Each information item may be identified by the conduit through an identifier. In one embodiment, the information identifier corresponds to the name of the information item signaled from second handheld computer 200. For example, the information identifier may correspond to the name of a contact for a contact information item, a folder name, a calendar day, etc.

In another embodiment, the synchronization conduit assigns identifiers to each new information item signaled from another computer for subsequent synchronization processes. For example, ach information item signaled from seed handheld computer 200 that was not previously synchronized with the first handheld computer is synchronized on the first handheld computer 100 using the first protocol. When synchronization is performed for the first time on first handheld computer 100, the conduit assigns an identifier to that information item for use with subsequent synchronizations. When a subsequent synchronization is performed between first and second handheld computers 100, 200, the conduit determines whether the particular information item was previously synchronized on first handheld computer 100. The conduit uses the identifier of the information item to locate the corresponding information item already residing on first handheld computer 100, which was used previously to synchronize with that information item signaled from second handheld computer 200.

A synchronization conduit operating on first handheld computer 100 attempts to match the information identifier of the information item received from second handheld computer 200 to the corresponding information item residing on first handheld computer 100. The conduit determines a match if the information identifier received from the first handheld computer 100 matches an information identifier on the second handheld computer. The synchronization conduit then compares the content of the information items on each handheld computer which have the same information identifier. If the content of the information items are the same, no synchronization is necessary. If the content of the information items are not the same, then the information items are in conflict. When a conflict is determined for the information items identified by the information identifiers, the conduit synchronizes the information item residing on first handheld computer 100 with the information item provided by second handheld computer 200. In an embodiment, the conduit uses a variation of one of the synchronization protocols, such as described with the first and third protocols.

If no match is found for an information item signaled from second handheld computer 200, the conduit may perform the synchronization using a protocol such as the second protocol. In an embodiment, the conduit may discard the information item, or add the information item to the information residing on first handheld computer 100. The information items may be added to select indexes on first handheld computer 100. In a subsequent synchronization between first and second handheld computer 100,200, the identifier of the information item is matched to the information item that resides on both the first and second handheld computer 100, 200. Therefore, if the second handheld computer 200 is identified, the first handheld computer 100 may automatically recognize the added information item as information to be synchronized with second handheld computer 200 (as described with FIGS. 3 and 4).

Figure 3:
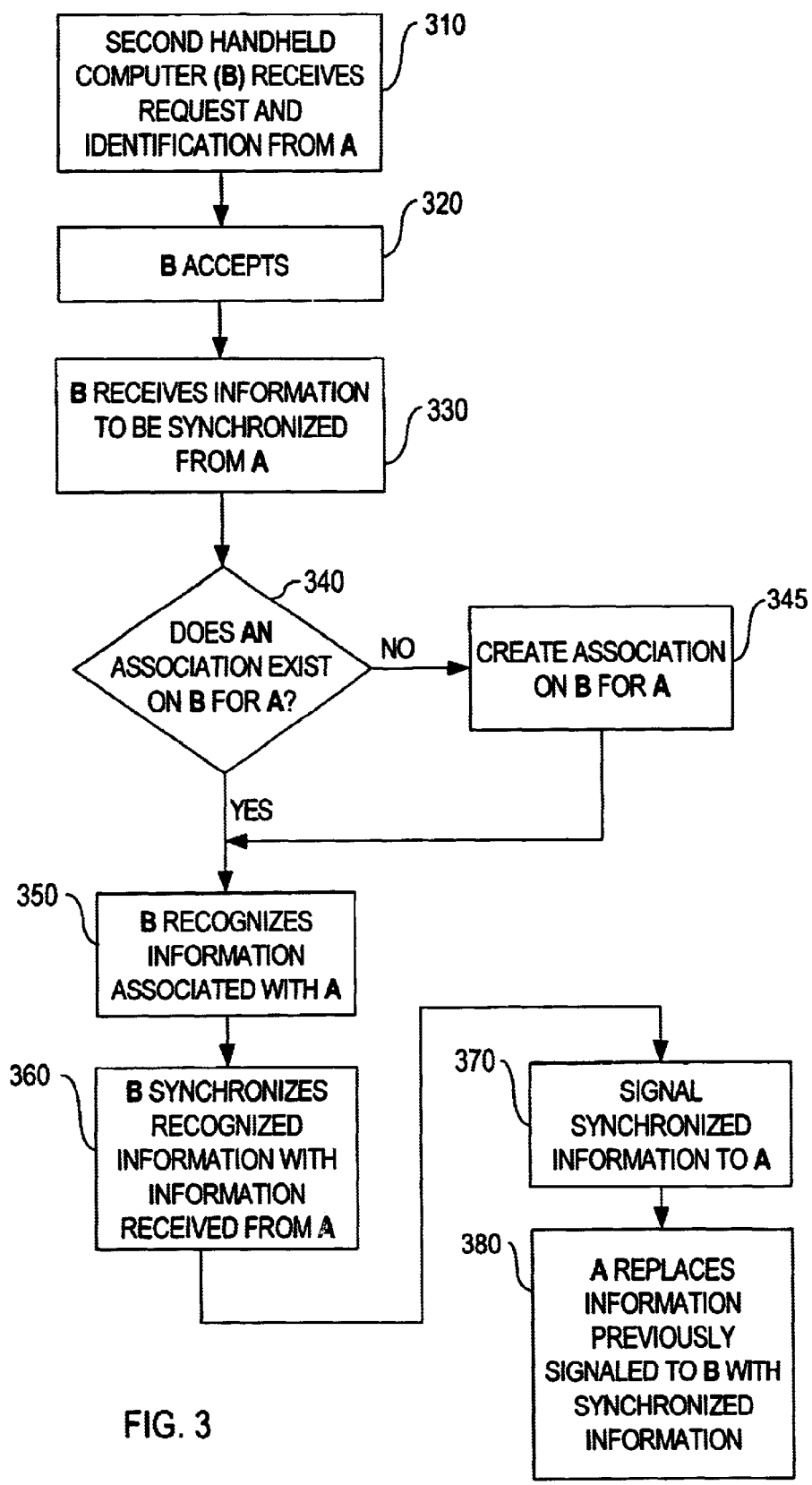
FIG. 3 is another flow process for operating a synchronization conduit on the handheld computer, under an embodiment of the invention.

FIG. 3 illustrates a process for synchronization of information between first and second handheld computers 100, 200, where the information to be synchronized is determined by an identification of one or both of the handheld computers. For simplifying discussion, synchronization is assumed to be performed on the accepting (second) handheld computer. The second handheld computer 200 then signals synchronized information to first handheld computer 100.

In step 310, second handheld computer 200 receives a request to synchronize from first handheld computer 100. The request, or another transmission from first handheld computer 100, may include an identification. The identification may be specific to first handheld computer 100. Alternatively, the identification may be specific to the user of first handheld computer 100.

In step 320, second handheld computer 200 accepts the request. In step 330, information from first handheld computer 100 is received by second handheld computer 200. The information may be in the form of records, segments of records, files, or folders.

In step 340, second handheld computer determines if association for the identification of first handheld computer 100 exists. If the association exists, then in step 350, existing information residing on second handheld computer 200 is recognized for synchronization with information received from first handheld computer 100. If the association does not exist, then in step 345, an association may be created. This may require prompting the user of second handheld computer 200 to identify information to be synchronized with handheld computer 100.

In step 360, information recognized on second handheld computer 200 is then synchronized with the information signaled from the first handheld computer 100.

In step 370, the information synchronized on second handheld computer 200 is signaled to the first handheld computer 100. In step 380, all information residing on first handheld computer 100 that was signaled to second handheld computer 200 is replaced by the synchronized information. The first handheld computer 100 may prompt the user before replacing the existing files with the synchronized files.

In one embodiment, information items residing on first handheld computer 100 are replaced by corresponding information items from second handheld computer individually, and in a sequential order. In this way, if the communication link between first and second handheld computers 100, 200 is broken once second handheld computer 200 signals first handheld computer 100, then information items are not lost from first handheld computer 100.

In an alternative embodiment, second handheld computer 200 signals the information recognized in step 350 to first handheld computer 100. The first handheld computer 100 then performs the synchronization process concurrently or independently of first handheld computer 100.

The associate between the identification of first handheld computer 100 and information to be synchronized by second handheld computer 200 may be made in any one of several ways. In one embodiment, the association corresponds to a determination as to whether first and second handheld computers 100, 200 have previously synchronized. Each time the handheld computers 100, 200 synchronize, a log is maintained detailing which records, files, and/or folders were synchronized. Whenever one of the handheld computer receives an identification from the other of the handheld computers to perform synchronization, the identification may be cross-referenced to the log. Each individual information in the record may include identifications which allow the receiving handheld computer to locate updated or altered versions of the same information. The information located by the identification is then used for the synchronization.

Figure 5:
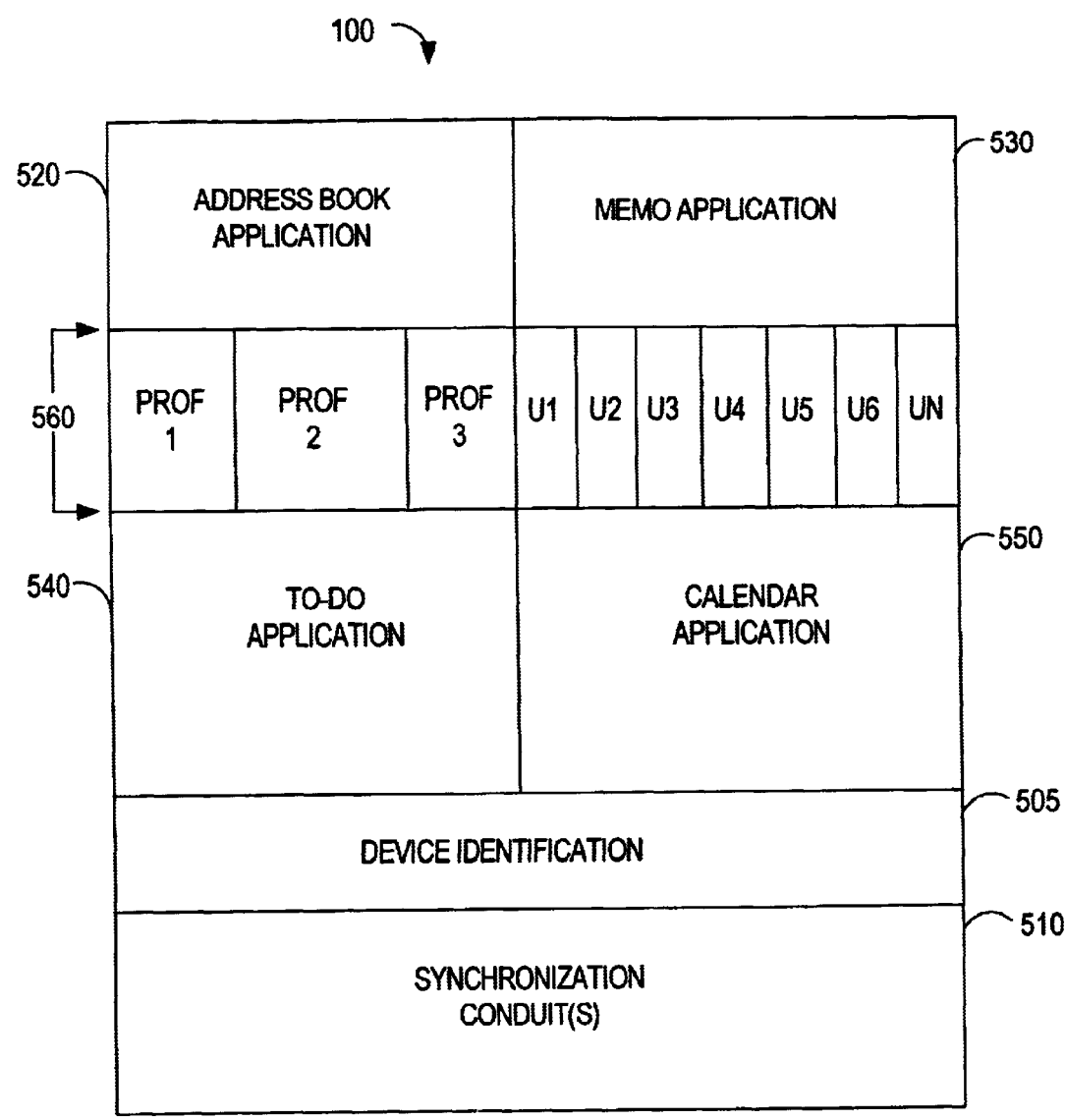
FIG. 5 illustrates software applications including a synchronization conduit and configurable indexes of information items, under an embodiment of the invention.

In another embodiment, the identification received by second handheld computer 200 may be cross-referenced to a profile or index (see FIG. 5 and accompanying text). For example, handheld computer 100 may identify itself to second handheld computer 200 as belonging to a particular user-group. Alternatively, second handheld computer 200 may associate a unique identification from first handheld computer 100 as belonging to a particular user-group. One or more profiles may exist on the handheld computer according to each user-group. The profiles group records, files, and/or folders to be synchronized with members of the user-group. Therefore, second handheld computer 200 may recognize information in a particular profile in response to receiving the identification from first handheld computer 100. The recognized information in the profile is then used for the synchronization process.

Figure 4:
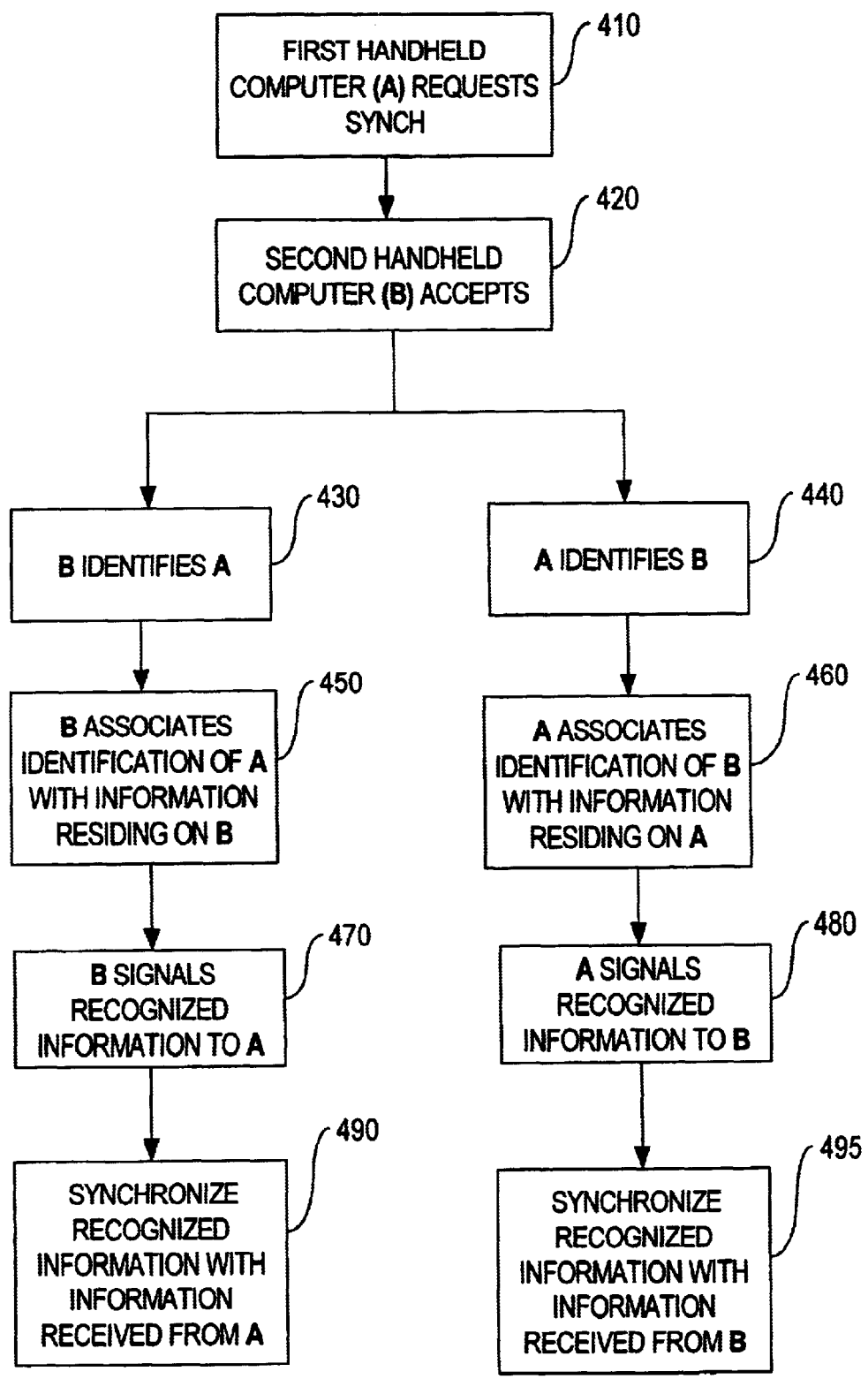
FIG. 4 is another flow process for operating a synchronization conduit on the handheld computer, under an embodiment of the invention.

FIG. 4 illustrates another embodiment in which identifications are used to identify what information is synchronized. This embodiment assumes that both the requesting and accepting handheld computers perform the synchronization process.

In step 410, first handheld computer 100 makes a synchronization request to second handheld computer 200. In step 420, second handheld computer 420 accepts the synchronization request.

In step 430, second handheld computer 100 identifies the first handheld computer 100. In an embodiment, first handheld computer 100 is identified using an identification signaled with the synchronization request. Alternatively, first handheld computer 100 may also be identified through user-input into second handheld computer 200. For example, a user of second handheld computer 200 may make entries to identify the first handheld computer 100. The entries may alternatively identify a profile or group for first handheld computer 100.

Concurrently, in step 440, first handheld computer 100 identifies second handheld computer 200. The identification may be made by receiving an acceptance from second handheld computer 200, in response first handheld computer 100 making a synchronization request. Alternatively, second handheld computer 200 may be identified through an entry made by a user of first handheld computer 100. For example, the user of first handheld computer 100 may make the synchronization request, and subsequently a specify the identity of the other user or handheld computer. Still further, the user of first handheld computer 100 may make a general identification as to a profile or user-group of second handheld computer 200.

On second handheld computer 200, step 450 provides that the identification made of first handheld computer 100 is associated with information residing on second handheld computer 200. The associated information is then selected for synchronization to be performed on second handheld computer 200. The associated information may be in the form of records, segments of records, files and folders. In one embodiment, profiles exist on the second handheld computer that are recognized for synchronization when any one of several identifications are made by second handheld computer 200 of another handheld computer. In another embodiment, identity specific folders reside on second handheld computer 200. For example, the information in the identity specific folders are recognized for synchronization when the identity of that folder is received by the second handheld computer 200.

On first handheld computer 100, step 460 provides that identification made of second handheld computer 200 is associated with information residing on first handheld computer 100. The associated information is then selected to be synchronized with corresponding information on second handheld computer 200. As with the association made on second handheld computer 200, profiles may exist on first handheld computer when any one of several identifications are made by first handheld computer 100 of another handheld computer. The profiles may recognize the information to be synchronized with that identification. In another embodiment, identity specific folders reside on second handheld computer 100 which are recognized when the identification of second handheld computer 200 is made.

In step 470, second handheld computer 200 signals the information recognized in step 450 to first handheld computer 100. Similarly, in step 480, first handheld computer 100 signals the information recognized in step 470 to second handheld computer 200. As with previous embodiments, first and second handheld computers 100, 200 may each use a wireless communication port to transmit information that is to be synchronized.

In step 490, second handheld computer 200 synchronizes information recognized in step 450 with information signaled from first handheld computer 100 in step 470. In step 495, first handheld computer 100 synchronizes information recognized in step 460 with information signaled from second handheld computer in step 480.

On each handheld computer 100, 200 synchronization may be performed in steps 470 and 480 using one or more synchronization protocols. The synchronization protocols used by each handheld computer 100, 200 may differ. For example, second handheld computer 200 may be configured or programmed to synchronize by replacing conflicting information with information from first handheld computer 100 (i.e. first protocol). Likewise, first handheld computer 100 may be configured or programmed to synchronize by identifying which records and segments of records are more recently updated as between the information exchanged between the two handheld computers 100, 200 (i.e. second protocol). Further, one or both handheld computers 100, 200 may be configured to prompt the user with a warning before any information previously residing on that handheld computer is deleted.

C. Software Components for Exemplary Handheld Computer

FIG. 5 illustrates a configuration for first (or second) handheld computer 100, under an embodiment of the invention. The configuration illustrates applications having information items that may be synchronized with other handheld computers. The handheld computer 100 includes a synchronization conduit program 510 for synchronizing with other handheld computers. The handheld computer 100 also includes an address book application 520, a memo application 530, a to-do application 540, and a calendar application 550. The handheld computer 100 also includes a device identification 505.

The handheld computer 100 includes stored information items 560 that can be shared with another handheld computer. Each application program may be operated by a user to enter new information items. In addition, the application programs may be operated to recall, reconfigure and/or alter stored information items. Each information item may be formatted for a particular application program.

As an example, calendar application 550 can be used to store or manipulate records corresponding to calendar blocks or events. The address book application 520 enables uses to store or manipulate records for contact information of individuals and organizations. The to-do application 540 enables users to store, and/or manipulate lists. Likewise, the memo application 530 enables users to store and/or manipulate memos.

The stored information items 560 may be arranged or sorted into separate indexes. As used herein, an index refers to a list or collection of one or more information items. Examples of indexes include folders, directories, and lists. Each index may be visible or invisible when a user operates handheld computer 100. A user of handheld computer 100 may select an index to be synchronized. The user may command or otherwise configure the conduit to synchronize the information item when handheld computer 100 is coupled to another handheld computer.

In an embodiment, each index may share information items with one or more other indexes configured on handheld computer 100. Thus, one information item may appear on multiple index.

The user may also configure handheld computer 100 to form index specific to a particular identity of another user or handheld computer. In FIG. 5, U1, U2 . . . Un each represent an index of information items for a particular user, handheld computer, or other device. As an example, a user may configure handheld computer 100 to include first index U1 of information items that may be shared with a co-worker. The user may configure handheld computer 100 to include second index U2 for another set of information to be shared with a spouse. Information items in U1 may pertain to working calendar events and professional contacts, while information in U2 may include personal contacts and events for weekend or holiday dates. Thus, a user may select through a first entry a first subset of information contained in U1 that is synchronized with another handheld computer co-worker. Then a user may select through another entry another subset of information that is synchronized with a handheld computer operated by a spouse.

In an embodiment, handheld computer 100 may also be configured to include index of information items that are arranged as profiles. Each profile P1, P2 . . . PN may be used to exchange information with any one of a plurality of users. For example, profile P1 may include a general index of information items pertaining to a work environment of the user, including work-related contact information, tasks, memos, and calendar events/blocks. The user of handheld computer 100 may share P1 with co-workers alike. A second profile P2 may include a smaller group of co-workers whom the user of handheld computer 100 communicates with more often. To exchange information with a particular co-worker, the user may signal information items listed with either P1 or P2, depending on the identity of the other user, as well as the situation in which information is being exchanged. As another example, profile P3 may include personal information items, that can be shared with, for example, family members. The user may configure first handheld computer 100 to include one or more profiles as desired.

The handheld computer 100 includes a memory (not shown) for storing information items. The memory may be a FLASH type component. In addition, handheld computer 100 includes a processor for operating the programs, including the conduit program 510 and the application programs 520–550. The processor of the handheld computer may sort the information items into categories or other indexes.

The application programs 520–550 are intended only to be exemplary. Other programs may similarly be interfaced with conduit 510 to enable synchronization of information items with other handheld computers.

D. User-Interface for Applications Managed by Handheld Synchronization Conduit

Figure 6:
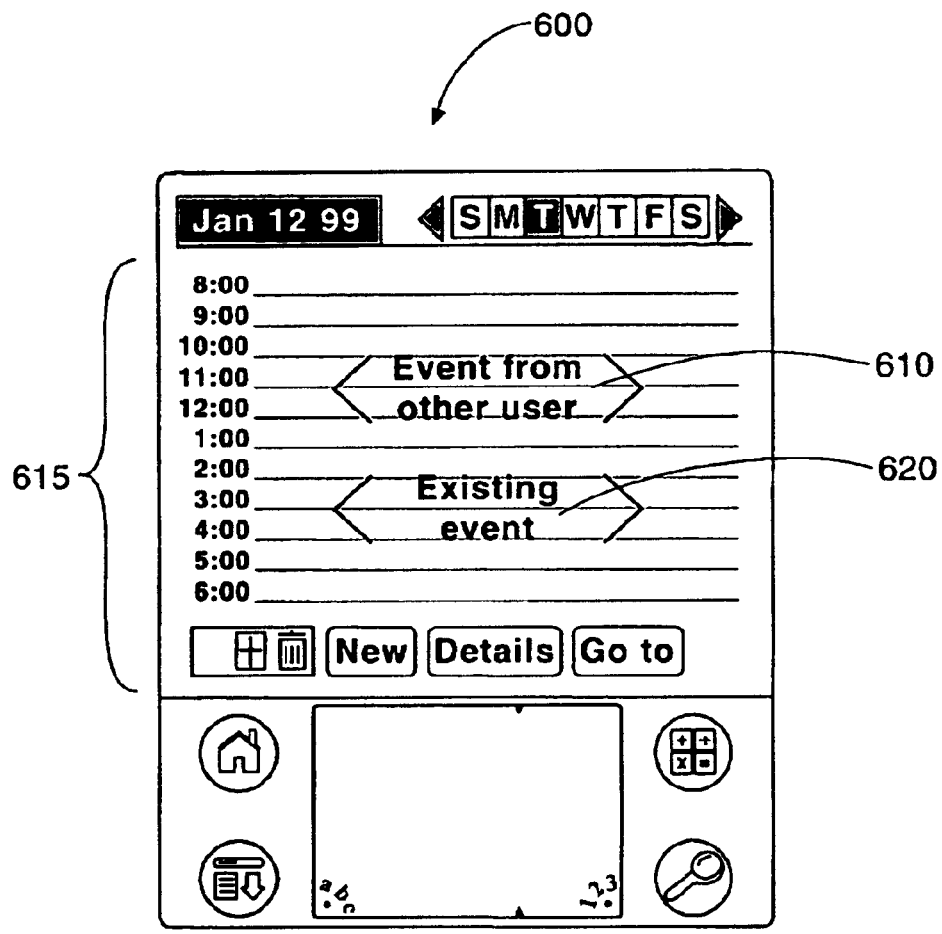
FIG. 6 is a user-interface of a calendar application after a synchronization process with another handheld computer, under an embodiment of the invention.

FIG. 6 illustrates a user-interface 600 for a calendar application 550 on first handheld computer 100, displaying synchronized information from second handheld computers 200, under an embodiment of the invention. The calendar application 550 is operated to display a calendar block 615 (i.e. one day). The calendar block can be filled-in with appointments or reminders. In this example, the information items correspond to portions of the calendar block 615 that are filled in with appointments 610, 620.

In an embodiment, first handheld computer 100 communicates with second handheld computer to synchronize calendar block shown 615. After the synchronization process, the user-interface 600 appearing on first handheld computer 100 displays the same information items as the user-interface of the calendar block on second handheld computer 200.

In the example shown by FIG. 6, the information items appearing on calendar block 615 originate from both handheld computers 100, 200. That is, appointment 610 may originate from second handheld computer 200, while appointment 620 was existing on first handheld computer 100 before the synchronization took place. This type of synchronization may result when second handheld computer 200 includes information items (appointment 610) that are more recent or non-existent when compared to the existing content of the calendar block.

In an embodiment, appointment 620 may appear on the user-interface of second handheld computer 200, after the synchronization process between the two handheld computers is complete. Other embodiments may provide different protocols or combination of protocols to combine information items (appointments in this example) for the calendar block 615. For example, first handheld computer 100 may act as a slave to second handheld computer 200, so that all appointments for calendar block 615 are derived from the second handheld computer. Any existing appointments on calendar 615 may be overwritten.

Figure 7:
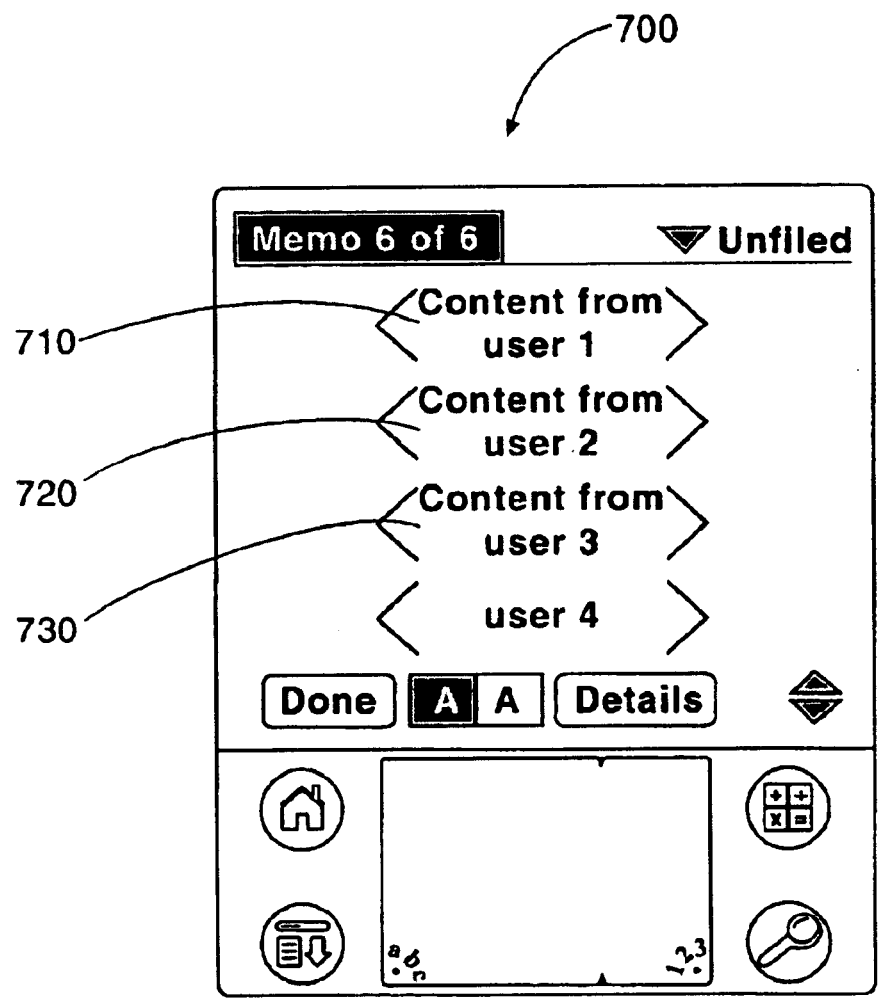
FIG. 7 is a user-interface of a memo application after a series of synchronization processes with another handheld computer, under an embodiment of the invention.

FIG. 7 illustrates a user-interface 700 for a memo file of a memo application 530, under an embodiment of the invention. The user-interface 700 is assumed to appear on first handheld computer 100, and includes information items from first and second handheld computer 100, 200. In this example, the user of first handheld computer 100 enters an information item in the form of a memo content 710. The user then synchronizes information with second handheld computer 200. The information synchronized includes the memo file. After a first synchronization process, the contents of the memo file is contained on both handheld computers 100, 200. Further, the memo content 710 appears on the user-interface 700 of the memo file on the first and second handheld computers 100, 200.

In the example shown, the user of second handheld computer 200 adds a memo content 720 to the memo file. During a next synchronization between handheld computers 100, 200, the memo file is synchronized so that memo content 720 appears on user-interface 700 with memo content 710. The first handheld computer 100 may identify the memo file from the previous synchronization. The synchronization may be accomplished through, for example, a variation of the third protocol, where new content to a memo file is added to existing content during the synchronization process.

The synchronization process may be repeated for the memo file between the two handheld computers 100, 200. With each synchronization, additional memo content 730 may be added to user-interface 700. In this way, the memo application 530 may be used to exchange messages using a synchronization process. Content may progressively be added to the memo file so that user-interface 700 contains a history of exchanged messages between first and second handheld computers 100, 200.

In an embodiment, memo files may each be individually identified as an indexes for specific synchronization processes with other handheld computers. For example, the user of first handheld computer 100 may store the memo file so as to be able to signal it as needed, if the second handheld computer is within range. The resulting message list between the two handheld computers acts as a messaging application, specific for first and second handheld computers 100, 200.

E. Alternative Embodiments

While an embodiment such as shown by FIG. 2 displays first and second handheld computers 100, 200 each performing synchronization processes, other embodiments may provide that only one of the handheld computers performs the synchronization process and signals the synchronized information to the other of the handheld computers. For example, the requesting handheld computer may signal information to be synchronized to the accepting handheld computer, in which case the accepting handheld computer performs the synchronization process. The accepting handheld computer then signals the synchronized information to the requesting handheld computer. Alternatively, the accepting handheld computer signals information to be synchronized to the requesting handheld computer. The requesting handheld computer then synchronizes the information and signals the synchronized information back to the accepting handheld computer.

With respect to embodiments described above, a requesting handheld computer transmits the information to be synchronized with an initial synchronization request. But the information transmitted from the requesting terminal is made available on the accepting handheld computer if the accepting handheld computer accepts the synchronization requests.

In one embodiment, first handheld computer 100 performs synchronization with information signaled from second handheld computer 200. During the first synchronization process between first and second handheld computers 100, 200, the conduit on first handheld computer 100 assigns an identification to one or more synchronized information items. The identification is passed back to first handheld computer. The identification is then used for a synchronization process between the first handheld computer 100 and a third handheld computer that has also previously synchronized with second handheld computer 200.

In another embodiment, first handheld computer 100 may be programmed to signal for second handheld computer 200 at a particular time. For example, first handheld computer 100 can be programmed to signal for second handheld 200 computer during the night, when the handheld computer is anticipated to not be in use. If the second handheld computer 200 is located, the synchronization process may be completed programmatically, without requiring user-input.

F. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. A method for synchronizing data between a first handheld computer and other handheld computers, the method comprising:
    storing concurrently on the first handheld computer a first index and a second index;
    wherein said first index associates a first group of information items to a first entity associated with a second handheld computer;
    wherein said second index associates a second group of information items to a second entity associated with a third computer;
    wherein the first group and second group do not contain the same information items;
    wherein the first group and second group contain a first information item;
    selecting at least said first information item from the first index;
    signaling the first information item from the first handheld computer to the second handheld computer;
    identifying a second information item on the second handheld computer that corresponds to the first information item;
    synchronizing the second information item with the first information item;
    selecting at least the first information item from the second index;
    signaling the first information item from the first handheld computer to the third computer;
    identifying a third information item on the third computer that corresponds to the first information item; and
    synchronizing the third information item with the first information item.

2. The method of claim 1, wherein synchronizing the second information item with the first information item includes updating at least a portion of the second information item using the first information item.

3. The method of claim 2, wherein updating at least a portion of the second information item includes replacing the entire second information item with the first information item.

4. The method of claim 1, wherein synchronizing the second information item with the first information item includes determining which of the first or second information items is more recently updated.

5. The method of claim 4, wherein synchronizing the second information item with the first information item includes replacing the second information item with the first information item on the second handheld computer if the first information item is more recently updated.

6. The method of claim 4, wherein synchronizing the second information item with the first information item includes indicating the second information item as the synchronized information item if the second information item is more recently updated.

7. The method of claim 6, further comprising signaling the second information item to the first handheld computer, and replacing the first information item with the second information item on the first handheld computer.

8. The method of claim 1, wherein synchronizing the second information item with the first information item includes prompting a user of the second handheld computer to choose between the first information item and the second information item for the synchronized information item.

9. The method of claim 1, wherein synchronizing the second information item with the first information item includes comparing the first information item to the second information item.

10. The method of claim 9, wherein comparing the first information item to the second information item includes combining selected segments from the first information item and selected segments from the second information item to form a synchronized information item.

11. The method of claim 10, wherein comparing the first information item to the second information item includes comparing segments of each of the first or second information item to corresponding segments of the other of the first or second information item to identify which of the segment of the first or second information items are more recently updated as compared to the corresponding segment of the other of the first or second information item.

12. The method of claim 1, wherein signaling a first information item from the first handheld computer to the second handheld computer includes using a wireless port on the first handheld computer to communicate with a wireless port on the second handheld computer.

13. The method of claim 1, wherein selecting at least said first information item from a first index on the first handheld computer includes selecting a contact information item from an address book application of the handheld computer.

14. The method of claim 1, wherein selecting a contact information item includes selecting a information item including components selected from a group of data fields consisting of phone number, mailing addresses, and email addresses.

15. The method of claim 1, wherein selecting at least said first information item from a first index on the first handheld computer includes selecting an electronic memo from an index of memos.

16. The method of claim 1, wherein selecting at least said first information item from a first index on the first handheld computer includes selecting a task information item from a task application.

17. The method of claim 1, wherein selecting at least said first information item from a first index on the first handheld computer includes selecting a calendar information item from a calendar application.

18. The method of claim 17, wherein selecting the calendar information item includes selecting a calendar block.

19. The method of claim 17, wherein selecting the calendar information item includes selecting a calendar appointment.

20. The method of claim 1, wherein selecting at least said first information item from the first index includes selecting a first folder from the first index, the first folder comprising a plurality of information items.

21. The method of claim 20, wherein selecting a first folder from the first index includes selecting the first folder comprising a combination of contact information items and calendar information items.

22. A method for synchronizing data between a first handheld computer and a second handheld computer, the method comprising:

receiving one or more first information items signaled from the first handheld computer to the second handheld computer;

receiving a first identification from the first handheld computer;

using the first identification to identify second information items on the second handheld computer to be used in synchronizing the second information items with the one or more first information items; and synchronizing the second information items with the one or more first information items;

wherein said second handheld computer stores data that associates identifiers with multiple information items that include said second information items;

wherein said identifiers each identify either a set of one or more users or a set of one or more handheld computers; and wherein using the first identification to identify one or more second information items includes matching the first identification to at least one of the identifiers.

23. The method of claim 22, wherein receiving a first identification from the first handheld computer includes receiving the first identification signaled from the first handheld computer.

24. The method of claim 22, wherein receiving a first identification for the first handheld computer includes receiving the first identification signaled as an entry from a user of the second handheld computer.

25. The method of claim 22, wherein using the first identification to identify one or more second information items on the second handheld computer includes identifying a group of information items previously synchronized with a group of information items from the first handheld computer.

26. The method of claim 22, wherein using the first identification to identify one or more information items on the second handheld computer includes associating the first identification with a user group, and identifying one or more information items previously associated with the user group.

27. The method of claim 22, wherein using the first identification to identify one or more information items on the second handheld computer includes associating the first identification with a user group, and identifying one or more information items previously synchronized with another handheld computer identified as being in the user-group.

28. The method of claim 22, wherein synchronizing the second information items with the first information items includes updating the second information items using the first information items.

29. The method of claim 28, wherein updating the second information items includes replacing the second information items with the first information items.

30. The method of claim 22, wherein synchronizing the second information items with the first information items includes determining which of the first or second information items are more recently updated.

31. The method of claim 30, wherein synchronizing the second information items with the first information items includes replacing the second information items with the first information items on the second handheld computer if the first information items are more recently updated.

32. The method of claim 30, wherein synchronizing the second information items with the first information items includes indicating the second information items as synchronized information items if the second information items are more recently updated.

33. The method of claim 22, wherein synchronizing the second information items with the first information items includes prompting a user of the second handheld computer to choose between the first information items and the second information items for as synchronized information items for the second handheld computer.

34. A handheld computer comprising:

a communication port;

a memory, wherein said handheld computer is configured to store in said memory data that associates identifiers with multiple information items; and a conduit for communicating with a second handheld computer, the conduit recognizing information items received through the communication port from the second handheld computer, the conduit identifying a subset of existing information items among the multiple information items in response to receiving an identification from the second handheld computer, the conduit using the identification and the data to identify the subset of existing information items by matching the identification to at least one of the identifiers, and the conduit synchronizing the subset of existing information items with the information items from the second handheld computer.

35. The handheld computer of claim 34, wherein the conduit transmits the subset of existing information items to the second handheld computer with a corresponding identification.

36. The handheld computer of claim 34, further comprising a touch-screen display for receiving user input to manipulate operations of the conduit.

37. The handheld computer of claim 34, further comprising a stored first index that lists the existing information items of existing information items.

38. The handheld computer of claim 36, further comprising an electronic calendar program operated on the handheld computer, and wherein the subset of existing information items comprise one or more stored indexes of calendar events or calendar blocks.

39. The handheld computer of claim 38, wherein the subset of existing information items are calendar events stored in a designated profile.

40. The handheld computer of claim 34, further comprising an address book program, and wherein the subset of existing information items comprise contact information items.

41. The handheld computer of claim 34, wherein the conduit synchronizes the subset of existing information items by replacing the subset of existing information items with the information items from the second handheld computer.

42. The handheld computer of claim 34, wherein the conduit synchronizes the subset of existing information items by replacing segments of each of the subset of existing information items with corresponding segments of the information items from the second handheld computer.

43. The handheld computer of claim 34, wherein the conduit determines for each information item in the subset of existing information items whether that information item is more recently updated than a corresponding information item received with the information items from the second handheld computer, and replaces that information item with the corresponding information item received from the second handheld computer if the corresponding information item from the second handheld computer is more recently updated.

44. The handheld computer of claim 41, wherein the conduit determines for each information item in the subset of existing information items whether a segment in that information item is more recently updated than a matching segment of a corresponding information item received with the information items from the second handheld computer, and replaces the segment of that existing information item with the matching segment if the segment of the corresponding information item from the second handheld computer is more recently updated.

45. The handheld computer of claim 44, wherein segments of existing information items correspond to field entries inputted by a user of the handheld computer.

46. The handheld computer of claim 34, wherein the communication port is a wireless port.

47. The handheld computer of claim 46, wherein the wireless port is Bluetooth enabled.

* * * * *